Nov. 27, 1962

A. P. BEACHER 3,065,995

SAFETY TIRE AND WHEEL

Filed Sept. 8, 1961

INVENTOR.
ANDREW P. BEACHER,
BY
McMorrow, Berman + Davidson
ATTORNEYS.

Nov. 27, 1962  A. P. BEACHER  3,065,995
SAFETY TIRE AND WHEEL
Filed Sept. 8, 1961  2 Sheets-Sheet 2

INVENTOR.
ANDREW P. BEACHER.
BY
McMorrow, Berman & Davidson
ATTORNEYS

United States Patent Office 3,065,995
Patented Nov. 27, 1962

3,065,995
SAFETY TIRE AND WHEEL
Andrew P. Beacher, R.F.D., Melvin, Ill.
Filed Sept. 8, 1961, Ser. No. 136,888
1 Claim. (Cl. 301—39)

This invention relates to improvements in wheel structures for motor vehicles, and more particularly an automobile wheel structure provided with means to support the wheel in the event of a blowout or puncture causing the associated tire to become deflated, and serving to prevent unnecessary damage to the tire.

A main object of the invention is to provide a novel and improved safety tire and wheel structure which involves relatively simple components, which is compact in size, and which operates to support a wheel in the event the associated tire becomes punctured or wherein other conditions arise causing the tire to become deflated.

A further object of the invention is to provide an improved safety tire and wheel structure which involves inexpensive components, which is durable in construction, which enables the operator of a vehicle to retain control thereover when a tire becomes punctured or blows out, and operating to support the associated wheel so that the tire thereof will not be destroyed in the event of the escape of air from the tire.

A still further object of the invention is to provide an improved safety tire and wheel assembly for automobiles, said assembly involving relatively few parts, being easy to mount on a wheel, and providing protection against accidents in the event of sudden deflation or blowout of a tire on the wheel.

Further objects and advantages of the invention will become apparent from the following description and claims, and from the accompanying drawings, wherein:

Figure 1:
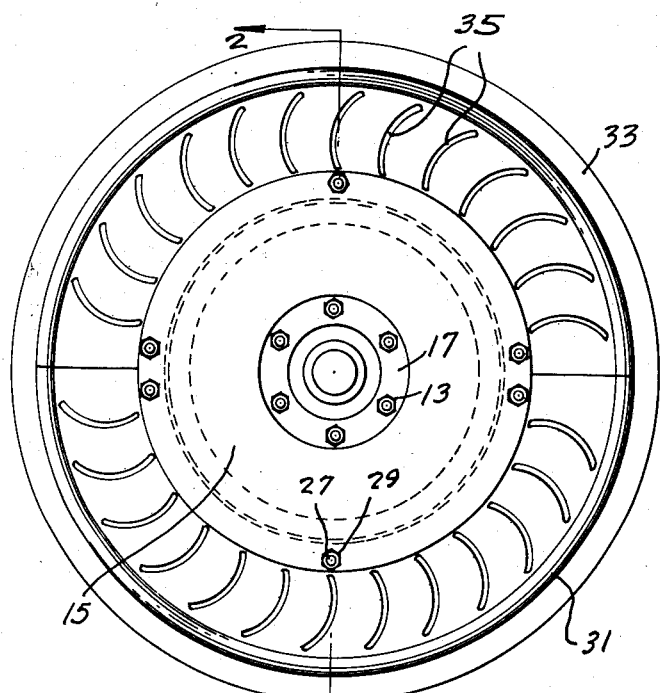
FIGURE 1 is a side elevational view of an automobile wheel equipped with one form of safety assembly in accordance with the present invention.
Figure 2:
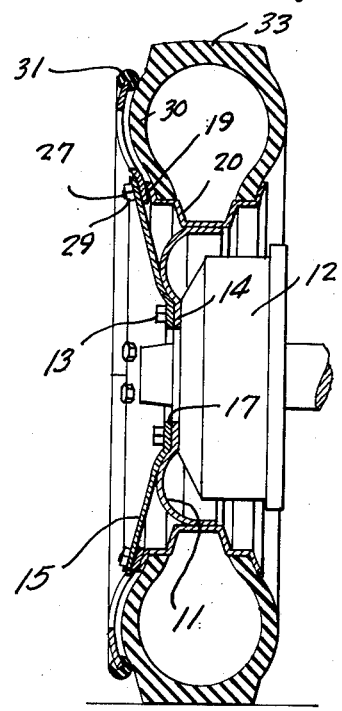
FIGURE 2 is a vertical cross sectional view taken substantially on the line 2—2 of FIGURE 1.
Figure 3:
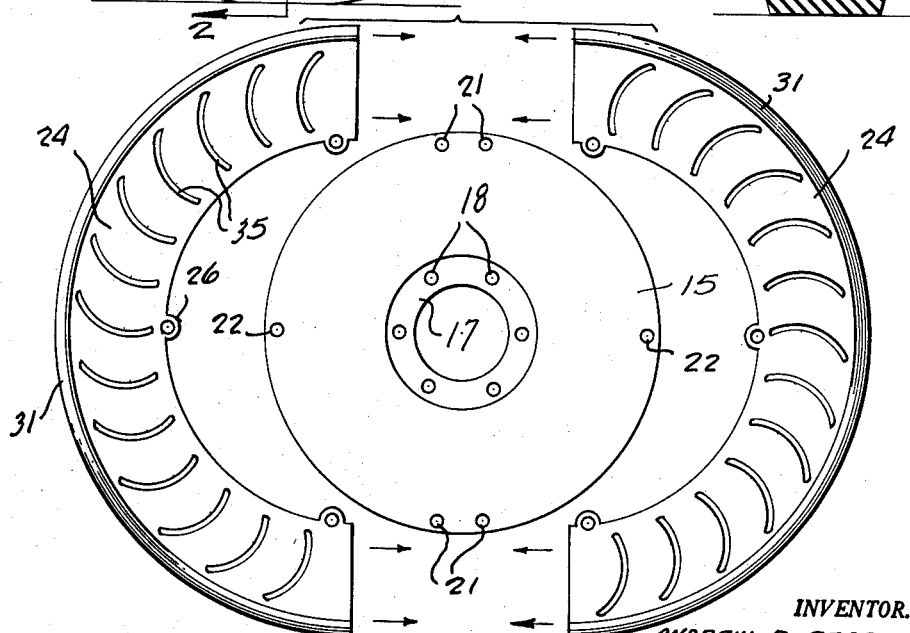
FIGURE 3 is a side elevational view showing the safety assembly components of FIGURES 1 and 2, the components being illustrated in separated positions.

Referring to the drawings, and more particularly to FIGURES 1, 2 and 3, 11 designates a conventional motor vehicle wheel which is secured in the usual manner on a brake drum 12, for example, by a plurality of studs or bolts 13 extending through openings provided in the inner peripheral rim portion 14 of the wheel 11. Designated at 15 is a circular disc which is secured to the brake drum 12 conjointly with the inner rim portion 14 of wheel 11 by the bolts 13, the disc 15 being provided with the inner rim portion 17 having the apertures 18 registering with the apertures provided in the inner rim portion 15 of wheel 11. Thus, as shown in FIGURE 3, the disc member 15 is substantially of annular shape and is generally frusto conical, so that it covers the wheel 11, the disc 15 being of sufficient size to extend adjacent to the outer flange 19 of the wheel rim 20.

The generally frusto conical annular disc member 15 is provided at its periphery with diametrically opposed pairs of apertures 21, 21 and with additional apertures 22, 22 on a diameter perpendicular to the diameter defining the positions of the pairs of apertures 21, 21. Designated at 24, 24 are a pair of generally semicircular, arcuately curved plate elements which are dimensioned so as to be engageable on the periphery of the disc member 15 so as to overlap same, the plate members 24, 24 being provided with apertured lugs 26 registrable with the apertures 21 and 22 of the disc member 15. Rigidly secured to the rim flange 19 are respective studs 27 which are spaced so as to be engageable through apertured lugs 26 and the apertures 21 and 22 of the disc member 15, suitable clamping nuts 29 being provided on the studs 27 to secure the members 15 and 24, 24 to the rim flange 19 in the overlapping positions thereof illustrated in FIGURE 2 and with the ends of the plate members 24, 24 in abutment so that the plate members 24, 24 define a continuous, generally annular-shaped plate element extending around the wheel and lying closely adjacent to the side wall 30 of the tire engaged on the wheel rim 20, as shown in FIGURE 2. Secured on the outer peripheral edges of the segments 24, 24 are respective enlarged beads or strips 31 of resilient deformable material, such as rubber, or the like, the strips being generally circular in transverse cross section, as shown in FIGURE 2, and defining auxiliary tread elements. Thus, the segments 24 terminate inwardly of the outer periphery of the tire tread 33, as illustrated in FIGURE 2, the auxiliary tread member 31 being thus located inwardly adjacent to the main tread portion 33.

Should the tire become deflated, the wheel will be temporarily supported on the resilient auxiliary tread element 31, and may be supported on said auxiliary tread element for a sufficient length of time to prevent loss of control of the vehicle. Thus, the device operates to allow the operator to maintain adequate control of the vehicle when a blowout of a tire occurs, or when the tire becomes suddenly deflated, so as to prevent a serious accident.

The plate members 24, 24 preferably are provided with uniformly spaced, arcuately curved slots 35 which serve to ventilate the area adjacent the side wall 30 and also serve to allow for the escape of mud or other foreign material by centrifugal force so that the space between the plate members 24 and the side wall of the tire does not become filled with foreign material.

As will be readily apparent, the presence of the safety device comprising the members 24, 24 and the disc member 15 does not in any way interfere with changing of a tire, since the device is secured to the wheel 11 and does not prevent the unfastening of the wheel from the brake drum 12.

Figure 6:
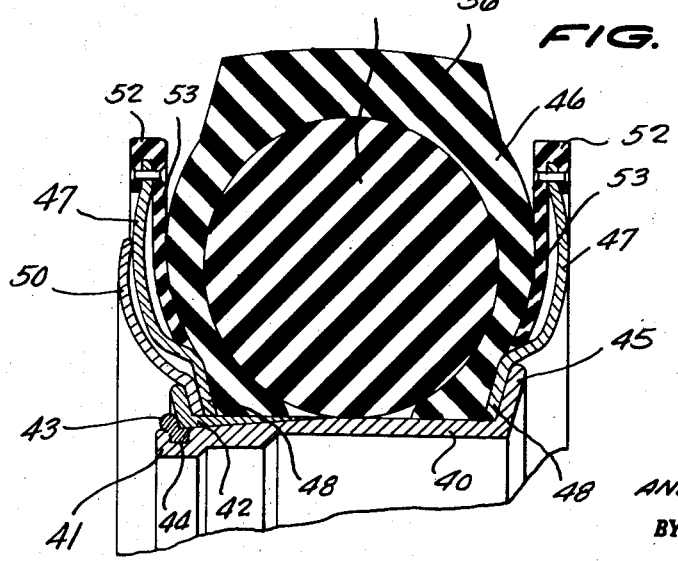
FIGURE 6 is an enlarged fragmentary transverse vertical cross sectional view taken through a portion of the structure shown in FIGURE 4 and showing details of the safety device of the present invention employed therein.

Referring now to the form of the invention shown in FIGURES 4, 5 and 6, 40 generally designates the rim portion of a conventional truck wheel, the wheel also including the outwardly extending locking flange 41. As shown in FIGURE 6, a conventional annular locking ring 42 is wedgingly engageable on the rim 40, being held in clamping position by a split ring 43 engageable in a locking groove 44 provided in the flange 41. The locking ring 42 is intended to cooperate with the inner rim flange 45 to retain a tire 46 on the rim 40 of the wheel. The structure thus far described is entirely conventional and forms no part of the present invention.

Designated at 47, 47 are respective annular arcuately shaped plate elements which are mounted on the wheel rim 40 and which are provided with inner flange portions 48, 48 adapted to be engaged adjacent the respective inner bead portions of the tire side walls in the manner illustrated in FIGURE 6. Designated at 50 is an auxiliary annular, arcuately curved washer member which is employed as a bracing means for the outer plate member 47 and which is engageable between the inner rim of plate member 47 and the annular locking ring 42, as illustrated in FIGURE 6. The members 47, 47 are identical in shape and each of said members is provided on its periphery with an auxiliary tread portion 52 of resilient deformable material, each tread portion 52 being provided with an inwardly extending annular flap portion 53 which is interposed between the adjacent tire side wall and the inner portion of the annular member 47 so as to serve as a filler means to prevent dirt and other material from entering the space between the side wall of the tire and the annular adjacent plate member 47. As in the previously described form of the invention, the auxiliary tread elements 52, 52 are located inwardly of the main tread portion 56 of the tire 46. Thus, in the event that the tire becomes deflated, the wheel will be supported on the auxiliary tread elements 52, 52 for a sufficient length of time to allow the driver to retain control of the vehicle and to thus avoid a serious accident.

Figure 4:
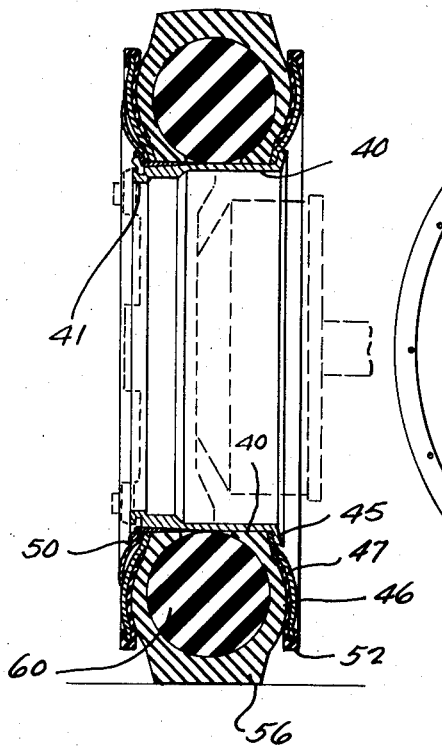
FIGURE 4 is a transverse vertical cross sectional view taken through the tire supporting portion of a truck wheel assembly provided with improved safety means according to the present invention.
Figure 5:
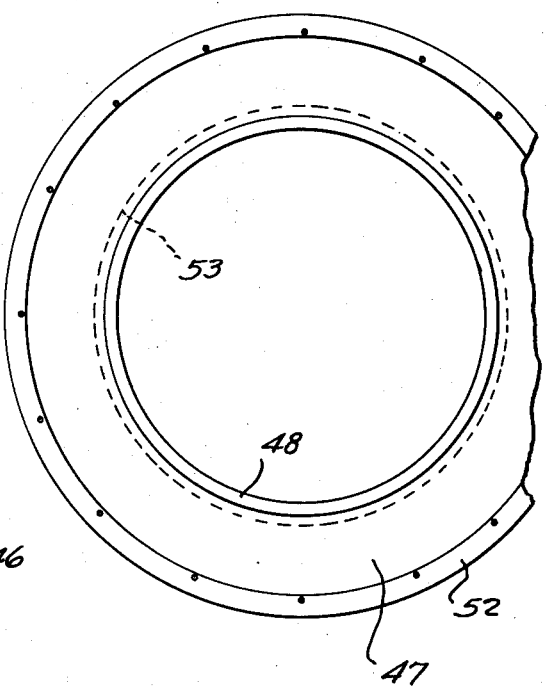
FIGURE 5 is a fragmentary side elevational view of the safety assembly illustrated in FIGURE 4.

As shown in FIGURES 4 and 6, the tire 46 may be filled with soft rubber material 60 to aid in preventing complete deflation of the tire and to thus act in cooperation with the tread elements 52, 52 to prevent sudden collapse of the tire and loss of support for the associated wheel.

The annular, arcuately curved washer member 50 acts as a stiffening and bracing means for the outer arcuate plate member 47 and serves to maintain steady inward pressure on the outer member 47 which is of course transmitted to the tire and to the opposite annular plate member 47 and which braces the assembly so as to keep the members 47, 47 continuously in operative positions ready to assume the wheel load in the event the tire 46 becomes deflated.

While certain specific embodiments of an improved safety device for a motor vehicle wheel structure have been disclosed in the foregoing description, it will be understood that various modifications within the spirit of the invention may occur to those skilled in the art. Therefore it is intended that no limitations be placed on the invention except as defined by the scope of the appended claim.

What is claimed is:

A safety wheel structure comprising in combination a main wheel body adapted to be secured around a motor vehicle wheel axle and comprising an outwardly concave annular rim adapted to receive a pneumatic tire, a tire mounted in said rim, an arcuately curved annular plate element shaped conformably with and disposed adjacent a side wall portion of the tire, an auxiliary tread element of resilient deformable material mounted on the outer peripheral edge of said annular plate element, an inwardly extending annular flap portion formed integrally with said auxiliary tread element and interposed between the tire side wall portion and the annular plate element, the diameter of said plate element being smaller than the normal diameter of the tire, whereby the auxiliary tread element is disposed inwardly of the normal tread portion of the tire, an annular auxiliary washer mounted in the rim outwardly adjacent said annular plate element, an annular locking ring wedgingly engaged on the rim and having a peripheral flange outwardly adjacent to and engaging said auxiliary washer, a split ring lockingly engaged on said rim outwardly adjacent to and engaging said flange, said flange exerting inward force on said auxiliary washer, urging the auxiliary washer inwardly against said annular plate element, and a body of relatively soft resilient material filling the tire and cooperating with the auxiliary tread element to prevent sudden collapse of the tire.

References Cited in the file of this patent

UNITED STATES PATENTS

| 2,057,607 | Capehart | Oct. 13, 1936 |
| 2,242,788 | Marks | May 20, 1941 |
| 2,354,444 | Lyon | July 25, 1944 |
| 2,502,060 | O'Dea | Mar. 28, 1950 |
| 2,678,675 | Crowder | May 18, 1954 |

FOREIGN PATENTS

| 585,485 | France | Dec. 10, 1924 |
| 620,046 | France | Jan. 12, 1927 |
| 433,207 | Italy | Apr. 3, 1948 |
| 472,529 | Italy | June 23, 1952 |